J. R. WILLIAMS.
Machine for Cutting off Horseshoe-Blanks.
No. 225,252. Patented Mar. 9, 1880.

2 Sheets—Sheet 2.

J. R. WILLIAMS.
Machine for Cutting off Horseshoe-Blanks.
No. 225,252. Patented Mar. 9, 1880.

Attest:
J. Henry Kaiser.
Walter Allen

Inventor:
John R. Williams.
By Knight Bros
Atty's.

UNITED STATES PATENT OFFICE.

JOHN R. WILLIAMS, OF JOHNSTOWN, PENNSYLVANIA, ASSIGNOR TO CAMBRIA IRON COMPANY.

MACHINE FOR CUTTING OFF HORSESHOE-BLANKS.

SPECIFICATION forming part of Letters Patent No. 225,252, dated March 9, 1880.

Application filed December 19, 1879.

*To all whom it may concern:*

Be it known that I, JOHN R. WILLIAMS, of Johnstown, in the county of Cambria and State of Pennsylvania, have invented new and useful Improvements in Machinery for Cutting off Horseshoe-Blanks, of which the following is a specification.

The subject of my invention is a machine constructed with one or more pairs of saws adjustable on their mandrel, so that they may be set accurately at a distance asunder corresponding with the desired length for the horseshoe-blanks, said mandrel being mounted in a moving frame to permit the advancing and retracting of the saws to cause them to cut through a suitably-held blank-bar, and then retire.

The blank-bar is held in a gage having a pocket to receive the toe-calk, which pocket, being placed centrally between the planes of the saws, insures the cutting off of the blank of precisely equal length on each side of the toe-calk or center.

In order that my invention may be fully understood, I will proceed to describe it with reference to the accompanying drawings, in which—

Figure 1:
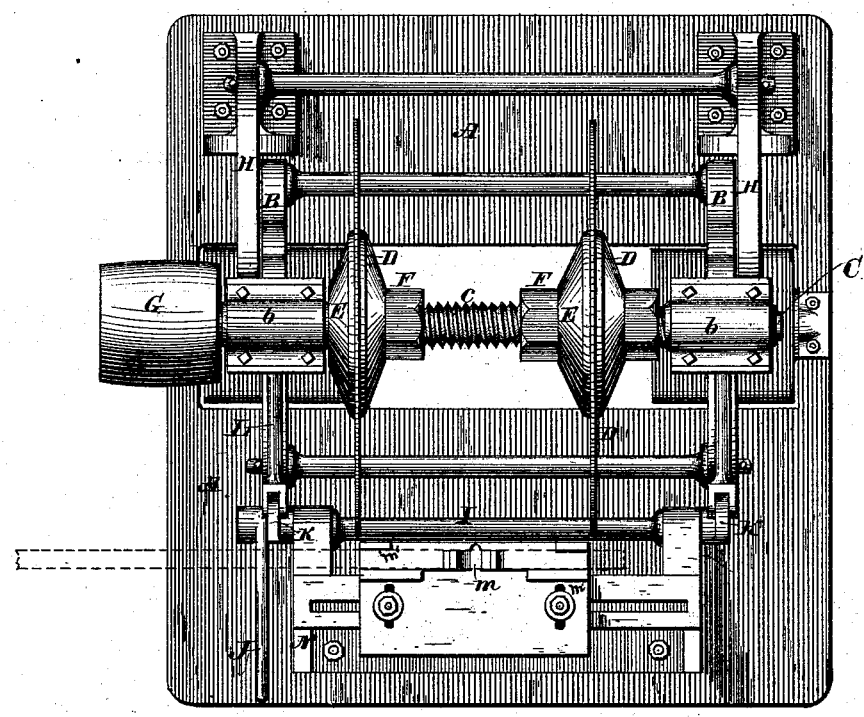
Figure 2:
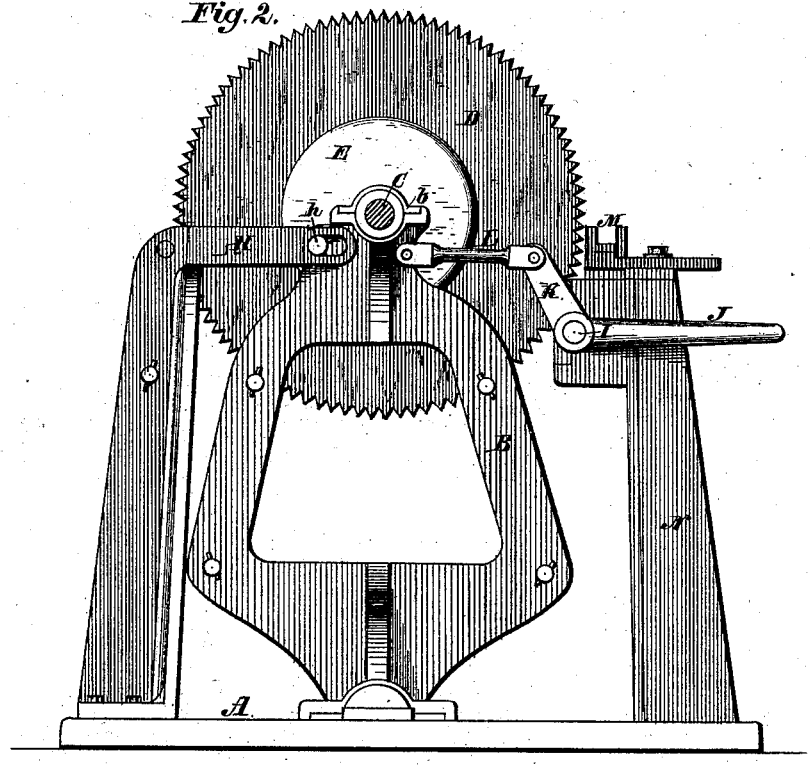
Figure 3:
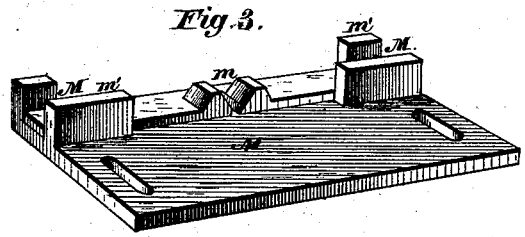
Figure 4:
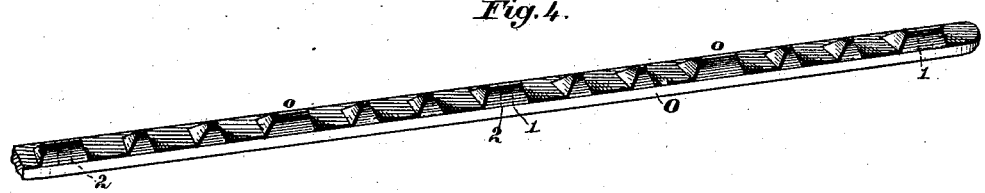

Figure 1 is a plan of the machine. Fig. 2 is a side elevation thereof. Fig. 3 is a perspective view of the gage or blank-bar holder. Fig. 4 is a perspective view of a blank-bar in inverted position.

A is a bed affording bearings for a vertical oscillating frame, B, in the upper part of which are boxes $b$ for the mandrel C of a pair of saws, D D, which are fixed thereon between collars E E, clamped upon the saws by nuts F F, the screw-thread $c$ on the mandrel extending from end to end, or to any necessary length to permit the adjustment of the saws thereon as to position and distance asunder.

G represents a driving-pulley, which in practice is operated by a belt so connected and arranged as to permit the forward-and-backward horizontal movement of the saw-mandrel without interfering with the running of the saws.

The frame is guided in its oscillating movement by studs $h$, working in standards H, rising from the bed A. The oscillating movement of the frame on its center in the bed A is produced by a rock-shaft, I, operated by a lever, J, carrying arms K K, connected by rods L L with the upper part of the frame B.

M represents the gage to receive the blank-bar. This is mounted adjustably on a standard, N, in which the rock-shaft I has its bearings.

The gage M is constructed with supports $m'$ $m'$ for the blank-bar O, and with a pocket, $m$, to receive one of the toe-calks $o$ thereof.

The blank-bar represented in Fig. 4 is produced by rolling after the manner described in Letters Patent No. 182,732, granted to me on the 26th day of September, 1876, with sets of pyramidal calks separated by elongated calks, so that by cutting the bar through every alternate elongated calk, as indicated by dotted lines in Fig. 4, blanks may be formed, the central calk $o$ constituting a toe-calk, and the severed halves of the elongated calks through which the cut is made serving as heel-calks.

My present invention is not limited, however, to the cutting up of calked bars, such as here shown, but is applicable to cutting up horseshoe-blank bars of any form provided with toe-calks.

In operation the saws are adjusted accurately to the distance asunder required for the length of the blank. The blank-bar O is then placed in the gage M, prepared to receive it, on the standard N, with one of the toe-calks $o$ in the pocket $m$. The saws are then drawn forward by a downward movement of the lever J, causing them to pass through the blank-bar on the dotted lines 1 1, Fig. 4, so as to saw off a shoe-blank accurately to the required length. The blank is then set with the next toe-calk $o$ in the pocket $m$, so that the next motion of the saws will produce the cuts indicated by the lines 2 2, and so on till the bar is used up.

The machine may, if preferred, be made with additional saws on the same mandrel to adapt it for cutting off two or more blanks at once.

Having thus described my invention, the following is what I claim as new therein and desire to secure by Letters Patent:

1. The adjustable gage M, constructed with a notch or pocket, $m$, to receive the toe-calk, for the purpose of centering the blank, and with the blank-supports $m'$ $m'$, as explained.

2. The combination of the gage M, oscillating frame B, and saws D D, as and for the purposes set forth.

3. The machine for sawing off horseshoe-blanks, constructed and operating in the manner and for the purposes explained.

JOHN R. WILLIAMS.

Witnesses:
OCTAVIUS KNIGHT,
WALTER ALLEN.